Jan. 4, 1955 H. BORKAN ET AL 2,698,874

APPARATUS FOR REDUCING NOISE AND CROSSTALK IN COLOR TELEVISION PICKUP TUBE SYSTEMS

Filed May 1, 1953 2 Sheets-Sheet 1

INVENTORS
HAROLD BORKAN
& PAUL K. WEIMER

BY Otis A. Mitchell

ATTORNEY

INVENTORS
HAROLD BORKAN
& PAUL K. WEIMER
BY [signature]
ATTORNEY 2,698,874

Patented Jan. 4, 1955

2,698,874

APPARATUS FOR REDUCING NOISE AND CROSS-TALK IN COLOR TELEVISION PICKUP TUBE SYSTEMS

Harold Borkan, Franklin Township, Somerset County, and Paul K. Weimer, Princeton, N. J., assignors to Radio Corporation of America, a corporation of Delaware Application May 1, 1953, Serial No. 352,542

4 Claims. (Cl. 178—5.4)

This invention relates to color television pickup systems and more particularly to color television pickup systems of the type employing a single camera tube to simultaneously derive a plurality of component color signals.

A pickup tube of this type is described in U. S. Patent No. 2,446,249 issued on August 3, 1948, to Alfred C. Schroeder. In the tube described therein component color image signals are derived from a plurality of interleaved conducting signal strips, each acting as a signal plate for a respective strip of a scanned mosaic charged in accordance with a particular one of the component colors. As employed in a three-color television system, for example, signals representing respectively red, green and blue component colors are derived from three separate output leads respectively connected to spaced ones of the interleaved conducting strips.

Another example of a single camera tube for simultaneously deriving a plurality of component color signals is a pickup tube of the photoconductive type as described in the co-pending application of Paul K. Weimer, Serial No. 344,497 filed March 25, 1953, and entitled "Cathode Ray Tube and Target." An embodiment of the tube disclosed therein includes a target comprising a glass base; a plurality of red, green and blue filter strips deposited thereon and interleaved in a predetermined sequence; a plurality of optically transparent, electrically conductive strips laid down on the filter strips such that a given conductive strip is superimposed upon a given one of the said filter strips; a continuous layer of photoconductive material, such as porous antimony sulphide, deposited over the conductive strips; and respective red, blue and gree bus bars connected to the appropriate ones of said conductive strips. As such a target is scanned by a cathode ray beam each bus bar is supplied its component color signal from the signal strips associated therewith in response to the discharge of those portions of the target which received an image representative charge as light of the respective component color passed through the optical filter strips associated therewith.

A problem of maintaining separation of component color signals often arises in a single camera tube of the type employing interleaved signal strips, such as the aforementioned Schroeder and Weimer tubes, primarily due to the coupling capacity between the respective sets of strips and secondarily due to leakage between strips. In the co-pending application of Edwin A. Goldberg, Serial No. 348,764 filed April 14, 1953, and entitled "Amplifying Systems," a solution to this problem of color crosstalk is embodied in the use of negative feedback in the signal amplifiers coupled to the output leads of a tube of this type. The input impedance of each component color signal channel is reduced dynamically to obtain satisfactory separation of the component color signals, while reductions in signal-to-noise ratio which would accompany the alternative use of a low physical input impedance are avoided.

In another co-pending application, that of Harold Borkan, filed April 29, 1953, Serial No. 351,840 and entitled "Amplifying Systems" the use of capacitive feedback, whereby the input impedance of each component color signal channel is essentially capacitive over a significant portion of the video frequency range, is proposed so that the output signal level of each feedback amplifier may be maintained as high above the noise level of a succeeding signal amplifying or other signal utilization stage as is compatible with satisfactory signal separation.

It has been proposed that in color image reproduction utilization of color information over only a lower frequency portion of the total video frequency range employed is sufficient, the higher frequency image details being effectively reproduced in black and white from brightness information representative of all the component colors. The present invention proposes a color pickup tube system particularly suitable for use in such color television systems wherein color information is utilized over only a lower frequency portion of the total video frequency range. In accordance with the invention a system is provided for deriving from a single camera tube of the type employing interleaved signal strips a plurality of respective component color signals over the lower frequency portion of the video frequency range with a reasonable signal-to-noise ratio and a minimum of crosstalk, and a brightness signal over the remaining portion of the video frequency range which has an exceptionally good signal-to-noise ratio. In accordance with an embodiment of the invention, a negative feedback path is established in each component color signal channel, the impedance of each feedback path being such that over the color-significant portion of the video frequency range the input impedance of each channel is sufficiently low relative to the impedances cross-coupling the target strip sets that satisfactory separation of component color signals is maintained, whereas over the remaining portion of the video frequency range the input impedance is no longer maintained low relative to the inter-strip impedances so that appreciable cross-coupling of the component color signals in the target structure is permitted. Adding means are coupled to all of the signal channels to combine the output signals of each. As a result a substantial degree of noise bucking occurs in the adding operation particularly in the high frequency portion of the video frequency range. High frequency noise generated in any of the signal amplifiers finds a readily available route through its associated feedback path and the inter-strip coupling impedances to the input circuits of the other channel amplifiers. Direct cancellation of this noise occurs in the adding means since the noise in the output of the generating amplifier is opposite in polarity to the resultant noise component appearing in the outputs of the other channel amplifiers. By permitting noise crosstalk in the higher frequency range wherein noise power is much greater than in the low frequency range, a very significant portion of the noise power associated with the channel amplifiers is removed from the pickup system through cancellation in the adding means.

In the fabrication of a target structure of the interleaved strip type an appreciable percentage of the signal strips may develop imperfections which take the form of breaks. When such a target is scanned, a strip portion isolated by the break will have its signal, and its dark current as well, passed to the adjacent strips by means of the capacity and leakage between strips. Thus, for example, scanning of the isolated portion of a broken green strip results in no signal in the green channel and unduly large signals in the blue and red channels. As a result, a spurious magenta streak would appear in a subsequent color image reproduction utilizing these signals. However, the effect of this type of target imperfection is minimized by the present invention in that the high frequency components of such spurious signals are kept out of the color information by the use of low pass filters in the respective component color signal channels, and do not appear at all in the composite brightness signal because the out-of-phase character of these spurious signals causes them to cancel out in the addition process.

Another type of undesirable signal may arise whenever the image includes closely spaced lines which are parallel to, or at a small angle with, the signal strips. The resultant beats have the effect of producing a so-called moire pattern in the subsequent color image reproduction. However, such moire effects are minimized by the present invention in that the high frequency beat signals are kept out of the color information by the use of the aforementioned low pass filters, and are applied only to the signal adding means. Therein, the addition of the beat signals from the three strip sets, each of which is slightly displaced in phase relative to the other two beat signals, results in a softening or essential elimination of the high frequency moire patterns.

Accordingly it is a primary object of the present invention to provide an improved color television pickup system.

It is a further object of the present invention to provide a color television pickup system which develops color information with a satisfactory signal-to-noise ratio and a minimum of color crosstalk over one portion of the signal frequency range, and develops substantially noise-free brightness information over the remaining portion of the signal frequency range.

It is an additional object of the present invention to provide a system for operating a single color pickup tube of the type employing interleaved signal strips such that crosstalk between strip sets is discouraged over a portion of the signal frequency range to permit component color signal separation, and crosstalk between strip sets is permitted over the remaining portion of the frequency signal range so that signal combining apparatus may develop substantially noise-free brightness information.

Another object of the present invention is to provide an improved color television camera system in which a very significant portion of the noise power associated with the camera preamplifier is directly eliminated in an adding stage.

A further object of the present invention is to provide a color television pickup system in which the effects of spurious signals due to target imperfections are minimized.

It is an additional object of the present invention to provide a system for operating a single-tube color television camera wherein the moire pattern effects are reduced.

Other objects and advantages of the present invention will be apparent to those skilled in the art upon a reading of the following detailed description and an inspection of the accompanying drawings in which.

Figures 1, 3:
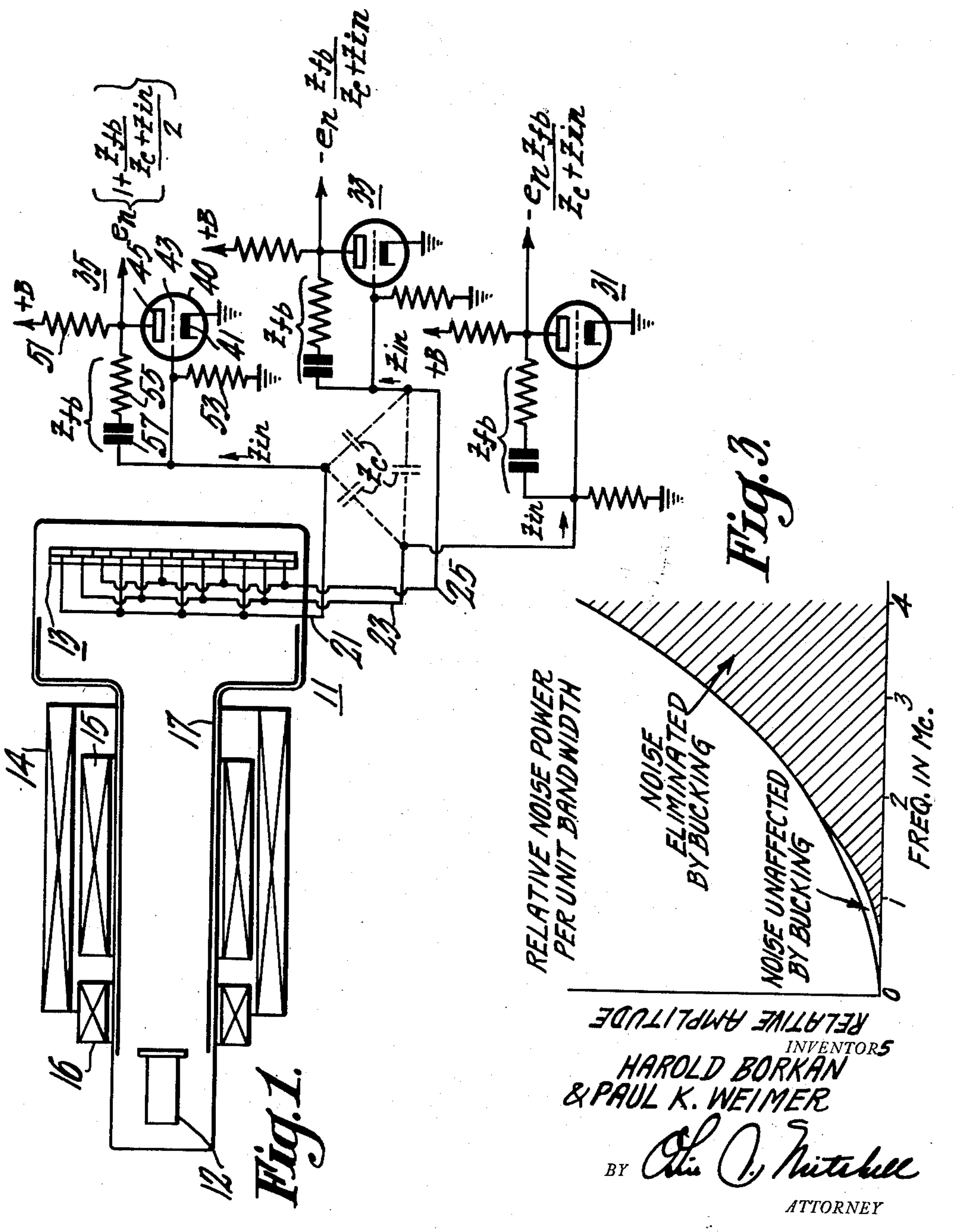
Figure 1 illustrates in block and schematic form a pickup tube-preamplifier system appropriate for use in a color pickup system embodying the principles of the present invention.
Figure 3 illustrates graphically the noise cancelling results which may be achieved employing a color pickup system of the type shown in Figure 2.

In Figure 1 a pickup tube 11 of the type disclosed in the aforementioned Weimer application is illustrated schematically. The tube is provided with a conventional electron gun 12, which may include the usual cathode, control electrode and one or more accelerating electrodes, which are supplied with operating potentials in a well known manner. A target of the previously mentioned character is illustrated as target 13 at the opposite end of the tube 11. Means are provided for focusing the electron beam developed by electron gun 12, and for scanning the beam over target 13 to develop a conventional scanning raster. These means may include focusing coil 14 and deflection yoke 15; an alignment coil 16 may additionally be provided. An electrode (not shown) permeable to the electron beam may be positioned adjacent to the target 13 and utilized together with focus coil 14 to ensure that the beam in its final approach to the surface of target 13 is normal thereto. A final accelerating electrode 17 may be in the form of a conductive coating on the interior of the envelope of the tube 11.

While the target 13 has not been illustrated in full detail, it will be appreciated from the previous description that the output leads 21, 23 and 25, which may take the form of bus bars incorporated in the target structure, are supplied with the respective blue, red and green component color signals derived from the appropriate conductive strips in the target structure 13. As illustrated, the respective output leads 21, 23 and 25 are coupled to separate color channels which include a blue feedback amplifier 31, a red feedback amplifier 33 and a green feedback amplifier 35. Since in accordance with the invention the three amplifiers may be substantially identical, only the green amplifier 35 will be described in detail.

The green amplifier 35 includes an amplifying stage incorporating an electron discharge device 40 which may, as illustrated, be a triode having a cathode 41, control grid 43 and a plate 45. The cathode 41 is connected to a point of reference potential (i. e. ground in the illustrated embodiment). This connection may be made via a cathode resistor shunted by by-pass capacitor if cathode biasing is desired. Plate 45 is connected to a source of anode potential (not illustrated) via the plate resistor 51. The green output signal appearing at plate 45 may be applied to subsequent signal utilization apparatus in the green channel which may, for example, include subsequent signal amplifying stages.

As in the amplifying system disclosed in the aforementioned Borkan application, a capacitive feedback path is established between the output electrode and input electrode of the amplifying stage. This is done by including capacitor 57 in a circuit connected between the plate 45 and grid 43 of the amplifying tube 40. The value of the capacitor 57 is chosen in relation to the value of the inter-strip coupling capacities $C_c$ so that the effective input impedance of the amplifying stage 35 is a desired fraction of the value of the inter-strip coupling impedances over at least the color-significant portion of the video signal frequency range. As an example, the value of the feedback capacitor 57 may be chosen so that the effective input impedance $Z_{IN}$ of the green amplifier stage 35 bears approximately a 1:10 relationship to the shunt impedance ($Z_s$) presented by the strip coupling impedances $Z_c$ to the input of amplifier 35 ($Z_s$ being essentially the parallel combination of $Z_c$ and $Z_c$ under these conditions).

The proper value of feedback capacitor 57 may be approximately determined by the expression:

$$C_{57}=\frac{2C_c}{x\mu}$$

where $x$ is the desired ratio of $$\frac{Z_{IN}}{Z_i}$$

and $\mu$ is the forward gain of the amplifying stage. It may be readily appreciated that while the amplifying system illustrated in Figure 1 employs single stage feedback loops, the principles of the invention are also applicable where a multi-stage feedback loop is employed (in which case the $\mu$ in the above expression would be the total forward gain of the multi-stage arrangement).

As has been noted before, the inter-strip coupling impedances are not solely capacitive, but rather include a leakage resistance component, which is effectively in shunt with the coupling capacity component. At very low signal frequencies the inter-strip coupling impedances will approach the value of these leakage resistances. Thus, if it is desired to substantially maintain the 1 to 10 ratio of $Z_{IN}$ to $Z_s$ in the range of very low signal frequencies, a grid leak resistor 53 of appropriate size may be connected between the grid 43 and ground. This grid leak resistor 53, which may in an illustrative example be of the order of 50,000 ohms, is effectively in shunt with the dynamic input impedance and establishes a maximum value which the input impedance approaches in the range of very low frequencies.

In cases where the leakage resistance value is low, a low valued grid leak resistor would be called for to obtain the above effect, but its use would be precluded in view of the accompanying increase in equivalent input noise current. Thus as an alternative in these cases, an appropriately valued resistor may be shunted across capacitor 57 in the feedback loop to obtain the desired ratio in the very low frequency range. A blocking capacitor would then be additionally required in the feedback path to prevent plate voltage from appearing at grid 43.

While it might be desirable for satisfactory component signal separation to maintain the 1 to 10 ratio of $Z_{IN}$ to $Z_s$ throughout the entire signal frequency range, it is generally not feasible to continue this relationship through the higher signal frequency ranges (say above 1 mc.), a practical reason precluding this continuance being that the output signal level may as a result be so low as to be substantially masked by the noise in a subsequent amplifying or other utilization stage. For this reason a low value feedback resistor 55 is preferably included in the negative feedback path in series with the capacitor 57 between plate 45 and grid 43. The small feedback resistor 55 establishes a minimum value which the input impedance of the amplifying stage approaches in the higher frequency bands of video signals.

While the effect of feedback capacitor 57, feedback resistor 55 and grid leak resistor 53 upon the effective input impedance of the amplifier 35 is explained more fully in the aforementioned Borkan application, it may be appreciated that the result is roughly to obtain an input impedance for amplifier 35 which is sufficiently low relative to the inter-strip impedances over the range of signal frequencies in which color information is desired that satisfactory separation of the component color signal is maintained over this range.

However, if over the remaining high frequency portion of the signal frequency range the input impedance of amplifier 35 is no longer maintained at a low value relative to the inter-strip impedances, appreciable crosstalk between component color signal channels ensues. The high frequency components of the output signal derived from amplifier 35 will then include an appreciable proportion of the blue and red component color signals as well as the green. This result is not objectionable in color television systems wherein color information per se is not requisite in the high frequency portion of the video frequency range, which range portion is rather devoted to brightness information. Thus, there is no disadvantage in the occurrence of crosstalk between the strip sets in this portion of the video range. Moreover, there is a distinct advantage in permitting crosstalk in this portion of the video range, for, if the pickup tube system is additionally provided with means for combining the outputs of the respective component color channel amplifiers, a substantial portion of the noise power generated in these amplifiers may be bucked out in the combining means so as to provide brightness information having a high signal-to-noise ratio.

It may readily be derived that where noise is generated in amplifying tube 40, the expressions for the resultant output noise voltage for the respective color channels will be as follows: in the green channel, $$e_n\left(1+\frac{2Z_{FB}}{Z_C+Z_{IN}}\right)$$

in the red channel, $$\left(-e_n\frac{Z_{FB}}{Z_C+Z_{IN}}\right)$$

and in the blue channel $$\left(-e_n\frac{Z_{FB}}{Z_C+Z_{IN}}\right)$$

where $e_n$ represents the noise voltage appearing at grid 43 for the noise generated in the tube 40, $Z_{FB}$ is the impedance of each of the similar feedback paths, $Z_C$ is the coupling impedance between each pair of strip sets, and $Z_{IN}$ is the effective input impedance of each of the similar feedback amplifiers. By comparing the above expressions it may be seen that summation of the resultant noise appearing in the red and blue channels is equivalent to the second factor of the noise expression for the green channel, which second factor will be generally a very substantial portion of the total noise, particularly in the higher frequency portion of the signal frequency range.

Figure 2:
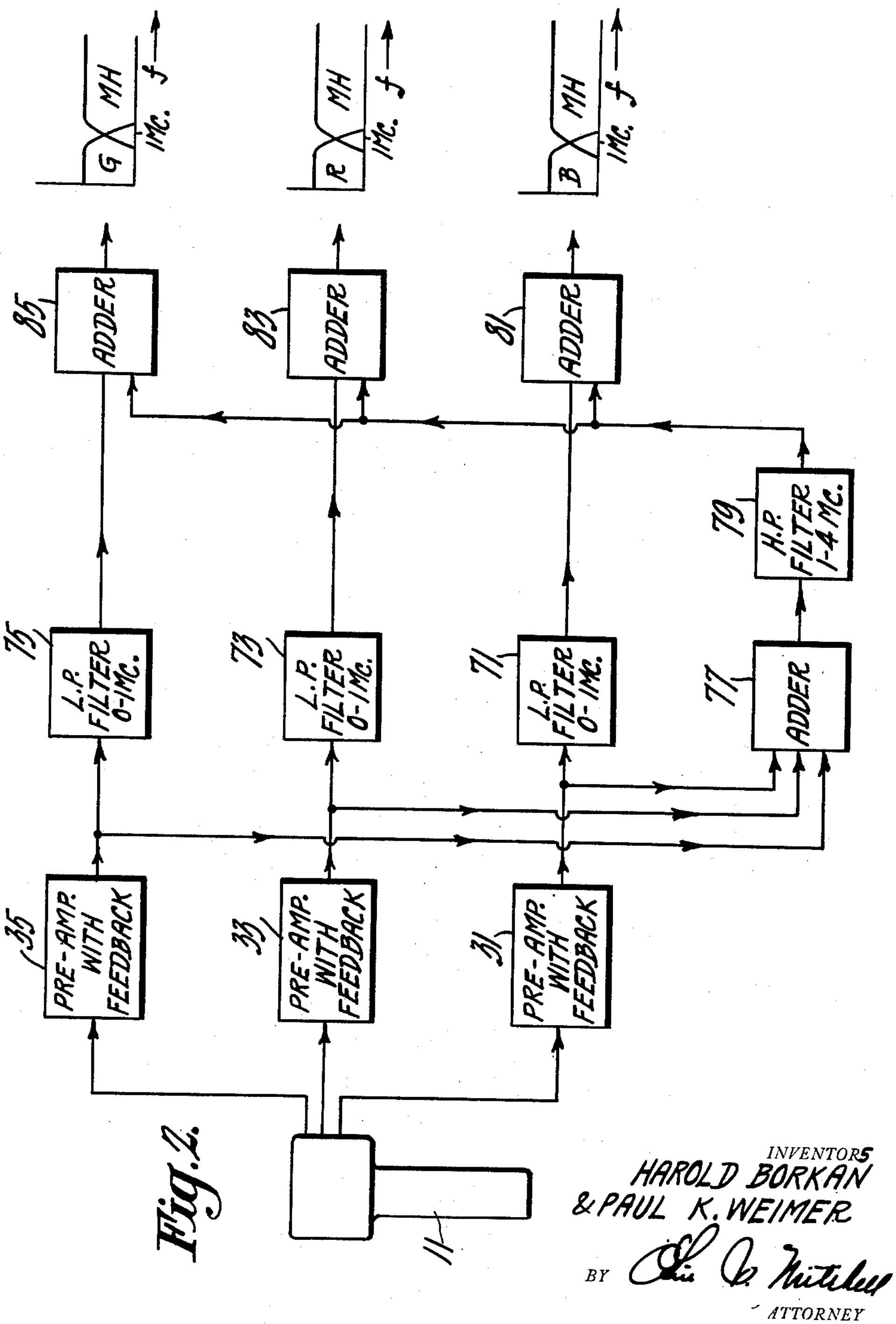
Figure 2 illustrates in block form an embodiment of the present invention in which the pickup tube-preamplifier system of Figure 1 may be employed.

Referring now to Figure 2, a color television pickup system employing the pickup tube 11 and respective channel amplifiers 31, 33 and 35 of Figure 1 is shown. Three low pass filters 71, 73 and 75 are respectively coupled to the output circuits of the blue amplifier 31, the red amplifier 33, and the green amplifier 35. The output of each of these low pass filters, which may have, for example, a pass band of 0–1 mc., is a respective component color signal which extends over that lower frequency portion of the video frequency signal range for which color information is desired. Each of these component color signal outputs will be substantially free of crosstalk from the other color channels due to the maintenance of a relatively low imput impedance in each channel amplifier over this range, as previously explained.

The output signals of each of the channel amplifiers is also coupled to the adder 77. As a consequence of directly combining the respective output signals in adder 77, it will be appreciated that the summation of the noise components appearing in the blue and red amplifier outputs due to green amplifier noise will directly cancel out a substantial factor of noise appearing in the green amplifier output due to its own tube noise. It will be similarly appreciated that the noise generated in the tubes of the blue and red feedback amplifiers will also be reduced in this way. Thus the output of adder 77 is a brightness signal, from which has been removed a considerable portion of amplifier noise, particularly in the higher frequency portions of the signal frequency range, in which portions brightness information alone is to be reproduced.

If the form of signal utilization apparatus with which the pickup system is associated so requires, a full band brightness signal may be taken from adder 77 for appropriate utilization. However where the particular signal utilization apparatus may require three separate channels, in each of which a mixed high brightness signal is combined with a particular component color low frequency signal, the output of adder 77 may be fed through a high pass filter 79, and the mixed high output thereof combined with the respective component color signals in adders 81, 83 and 85. The output of each of these adders will thus comprise a low frequency component color signal substantially free of crosstalk from the other color signals, and a mixed high brightness signal substantially free of amplifier noise.

Figure 3 illustrates graphically the relative noise power per unit band width generated in the preamplifiers of Figures 1 and 2, and by cross hatching the portions of noise power effectively removed from the system by noise bucking in the adder 77. As illustrated for a typical set of conditions under which the present invention might be utilized (i. e. where color information above 1 mc. is not required), it may be observed that the greater amplitudes of noise power occur in the high frequency regions wherein the noise bucking action of the present invention is most effective.

As has been noted previously, an appreciable percentage of the signal strips in the target structure 13 may be broken due to the difficulties in fabrication. Scanning of a signal strip portion isolated by such a break results in a zero signal in the channel associated with the broken strip and unduly large signals in the other two channels. However, the resultant appearance of a spurious colored streak in a subsequent color image reproduction is minimized in the pickup system shown in Figure 2. Since the high frequency components of the spurious signals are beyond the pass band of low pass filters 71, 73 and 75, they will not appear in the color information. In the adder 77, the effect of the spurious signal distribution caused by the break will be essentially eliminated since the excessive signals are combined therein with the deficient signal to obtain a brightness signal of substantially correct magnitude.

Similarly, moire pattern effects are minimized since the high frequency beat signals are not included in the color information passed by filters 71, 73 and 75. In the adder 77, the slightly phase-displaced beat signals are combined with a resulting softening and essential elimination of the high frequency moire patterns in a subsequent color image reproduction.

What is claimed is:

1. In a color television system wherein it is desired to utilize color information over only a portion of the total video signal frequency range, a pickup tube system comprising the combination of a cathode ray tube including an electron target structure comprising a plurality of interleaved sets of conducting strips for deriving respective component color signals, inherent coupling impedances existing between said sets of conducting strips, a plurality of respective component color signal channels, each of said signal channels including a signal amplifier having an input circuit and an output circuit, each of said strip sets being coupled to a respectively different one of said input circuits, means for providing each signal amplifier with a negative feedback path to the input circuit thereof, the impedance of each negative feedback path being such that over said portion of the total video frequency range the input impedance of each signal amplifier is sufficiently low relative to said inherent coupling impedances that a relatively high degree of component color signal separation is maintained over said range portion, whereas over the remaining portion of the total video frequency range the input impedance is sufficiently high relative to said inherent coupling impedances that crosstalk of the component color signals is permitted over said remaining range portion, a plurality of low pass filters, each of said low pass filters being coupled to a respectively different one of said output circuits, and means for adding the output signals of all of said signal amplifiers so as to produce a brightness signal from which a substantial portion of amplifier noise has been removed.

2. In a color television system, camera tube apparatus comprising the combination of a cathode-ray tube including an electron target structure comprising a plurality of interleaved sets of conducting strips for deriving the respective component color signals, inherent coupling impedances existing between said sets of conducting strips, a plurality of respective component color signal channels, each of said signal channels including a signal amplifier, each of said strip sets being coupled to a respectively different one of said signal amplifiers, feedback means associated with each said signal amplifier for substantially reducing the input impedance of each said signal amplifier relative to said inherent coupling impedances, a plurality of low pass filters, each of said low pass filters being coupled to a respectively different one of said signal amplifiers, an adder, and means for coupling all of said signal amplifiers to said adder.

3. Apparatus in accordance with claim 2 including a high pass filter coupled to said adder and respective means for combining the output of each of said low pass filters with the output of said high pass filter.

4. Apparatus in accordance with claim 3 wherein said feedback means is essentially capacitive over a color significant portion of the signal frequency range.

No references cited.